(12) United States Patent
Kim

(10) Patent No.: US 12,221,184 B2
(45) Date of Patent: Feb. 11, 2025

(54) APPARATUS FOR FOUR-WHEEL INDEPENDENT STEERING AND METHOD OF CONTROLLING SAME

(71) Applicant: HYUNDAI MOBIS CO., LTD., Seoul (KR)

(72) Inventor: Tae Hong Kim, Yongin-si (KR)

(73) Assignee: HYUNDAI MOBIS CO., LTD., Seoul (KR)

( * ) Notice: Subject to any disclaimer, the term of this patent is extended or adjusted under 35 U.S.C. 154(b) by 0 days.

(21) Appl. No.: 17/811,157

(22) Filed: Jul. 7, 2022

(65) Prior Publication Data

US 2023/0182811 A1    Jun. 15, 2023

(30) Foreign Application Priority Data

Dec. 14, 2021    (KR) .................. 10-2021-0178573

(51) Int. Cl.
*B62D 7/15*    (2006.01)
*B62D 6/00*    (2006.01)

(52) U.S. Cl.
CPC ............. *B62D 7/159* (2013.01); *B62D 6/003* (2013.01); *B62D 7/1545* (2013.01)

(58) Field of Classification Search
None
See application file for complete search history.

(56) References Cited

U.S. PATENT DOCUMENTS 5,019,982 A  *  5/1991  Furukawa ............... B62D 7/159
                                                  701/41
5,734,570 A  *  3/1998  Arlandis .................. B62D 6/00
                                                  701/41

(Continued)

FOREIGN PATENT DOCUMENTS

KR        10-2274120        7/2021

OTHER PUBLICATIONS

English Language Abstract of KR 10-2274120 published Jul. 7, 2021.

*Primary Examiner* — Behrang Badii
*Assistant Examiner* — Paysun Wu
(74) *Attorney, Agent, or Firm* — DLA Piper LLP US

(57) ABSTRACT

An apparatus for four-wheel independent steering. The apparatus may include: a rear wheel angle computation unit configured to compute a rear wheel angle ($\delta_r$) resulting by multiplying a front wheel angle ($\delta_f$) by a predetermined front/rear wheel angle ratio (Kss) corresponding to a vehicle speed (V); a gain computation unit configured to compute a gain (A) corresponding to a steering angle acceleration and the vehicle speed and then to output a final rear wheel angle ($\delta_r$) resulting by multiplying the rear wheel angle ($\delta_r$) computed by the rear wheel angle computation unit by the computed gain (A); and a control unit configured to perform rear wheel steering control based on the front wheel angle ($\delta_f$) and the final rear wheel angle ($\delta_r$).

6 Claims, 4 Drawing Sheets

(56) References Cited

U.S. PATENT DOCUMENTS

| | | | | |
|---|---|---|---|---|
| 2005/0234621 A1* | 10/2005 | Lin | ................ | B62D 7/159 |
| | | | | 180/408 |
| 2006/0020382 A1* | 1/2006 | Shin | ................ | B62D 7/159 |
| | | | | 180/443 |
| 2016/0107683 A1* | 4/2016 | Lee | ................ | B62D 7/159 |
| | | | | 701/41 |

* cited by examiner

APPARATUS FOR FOUR-WHEEL INDEPENDENT STEERING AND METHOD OF CONTROLLING SAME

CROSS-REFERENCE TO RELATED APPLICATION

This application claims priority from and the benefit of Korean Patent Application No. 10-2021-0178573, filed on Dec. 14, 2021, which is hereby incorporated by reference for all purposes as if set forth herein.

BACKGROUND

Field

Exemplary embodiments of the present disclosure relate to an apparatus for four-wheel independent steering and a method of controlling the same, and more particularly, to an apparatus for four-wheel independent steering, which is capable of providing a dynamic steering feel by adjusting a turning radius momentarily while following a target yaw rate when the four-wheel independent steering that controls a rear wheel steering angle according to a front wheel steering angle is controlled, and a method of controlling the same.

Discussion of the Background

Recently, in-wheel motor systems have been developed so that a motor is built into each wheel of a vehicle and four wheels can each be driven independently.

Such an in-wheel motor system is systematically combined into the vehicle to implement an apparatus for four-wheel independent drive and four-wheel independent steering, thereby providing more flexible and diverse driving performances.

A typical vehicle steers only front wheels to change a travel direction of a vehicle, and in this case, generation times of lateral forces in front and rear wheels are different, resulting in a mismatch between the travel direction of the vehicle and a gaze direction of a driver. However, the apparatus for four-wheel independent steering also applies a steering system to the rear wheels, thereby reducing the turning radius of the vehicle during parking or low-speed turning and improving the driving stability during at high-speed driving when turning.

In the related art, when a gear ratio between a front wheel and a rear wheel is determined to control an apparatus for four-wheel independent steering, the gear ratio therebetween is set on the assumption that a yaw rate and a body slip angle value converge to zero.

Therefore, four-wheel independent steering control has the merit of not only providing the inherent dynamic steering performance but also reducing a turning radius as compared to the conventional two-wheel steering. However, the turning radius cannot be reduced theoretically under the assumption that the yaw rate (yaw rate=vehicle speed/turning radius) converges to zero. That is, in a case where the yaw rate is zero, the turning radius is inevitably increased, which makes it difficult to provide the merit of the inherent four-wheel independent steering. Accordingly, when the gear ratio between the front wheel and the rear wheel is set to a fixed target value to achieve dynamic steering performance, the performance in the four-wheel independent steering control may be limited.

Therefore, in order for controlling the four-wheel independent steering, there is a need for a method of controlling four-wheel independent steering that adjusts a turning radius momentarily while following a target yaw rate and thus provides a dynamic steering feel.

The related art of the disclosure is disclosed in Korean Patent No. 10-2274120 registered on Jul. 1, 2021 and entitled "Apparatus and Method for Controlling Rear Wheel Steering System".

SUMMARY

Various embodiments are directed to an apparatus for four-wheel independent steering, which is capable of providing a dynamic steering feel by adjusting a turning radius momentarily while following a target yaw rate when the four-wheel independent steering that controls a rear wheel steering angle according to a front wheel steering angle is controlled, and a method of controlling same.

In an embodiment, an apparatus for four-wheel independent steering may include: a rear wheel angle computation unit configured to compute a rear wheel angle ($\delta_r$) resulting by multiplying a front wheel angle ($\delta_f$) by a predetermined front/rear wheel angle ratio (Kss) corresponding to a vehicle speed (V); a gain computation unit configured to compute a gain (A) corresponding to a steering angle acceleration and the vehicle speed and then to output a final rear wheel angle ($\delta_f$) resulting by multiplying the rear wheel angle ($\delta_r$) computed by the rear wheel angle computation unit by the computed gain (A); and a control unit configured to perform rear wheel steering control based on the front wheel angle ($\delta_f$) and the final rear wheel angle ($\delta_r$).

The gain computation unit may compute the gain (A) based on a look-up table (LUT) configured to store the gain (A) corresponding to the steering angle acceleration and the vehicle speed (V).

Because the higher the steering angle acceleration, the more increased the corresponding gain (A), the gain computation unit accordingly increases the final rear wheel angle ($\delta_f$) and outputs the resulting final rear wheel angle ($\delta_r$).

In an embodiment, a method of controlling an apparatus for four-wheel independent steering may include: computing, by a control unit through a rear wheel angle computation unit, a rear wheel angle ($\delta_r$) that results from multiplying a front wheel angle ($\delta_f$) by a predetermined front/rear wheel angle ratio (Kss) corresponding to a vehicle speed (V); computing, by the control unit through a gain computation unit, a gain (A) corresponding to a steering angle acceleration and the vehicle speed, and outputting a final rear wheel angle ($Y_r$) that results from multiplying the rear wheel angle ($\delta_r$) computed by the rear wheel angle computation unit by the computed gain (A); and performing, by the control unit, rear wheel steering control based on the front wheel angle ($\delta_f$) and the final rear wheel angle ($\delta_r$).

In the computing of the gain (A), the gain computation unit may compute the gain (A) based on a look-up table (LUT) configured to store the gain (A) corresponding to the steering angle acceleration and the vehicle speed (V).

In the computing of the gain (A), in the computing of the gain (A), because the higher the steering angle acceleration, the more increased the corresponding gain (A), the gain computation unit accordingly increases the final rear wheel angle ($\delta_r$) and outputs the resulting final rear wheel angle ($\delta_r$).

In an embodiment, an apparatus for four-wheel independent steering may include: a rear wheel angle computation unit configured to compute an error amount of a yaw rate in a manner that compares an actual yaw rate ($\dot{\omega}^2$) feedback with a predetermined target yaw rate and then to compute a corrected rear wheel angle ($\delta_r$) in a manner that multiplies a predetermined front/rear wheel angle ratio (Kss) by a gain being used to correct the error amount; and a control unit configured to perform rear wheel steering control based on the front wheel angle ($\delta_f$) and the corrected rear wheel angle ($\delta_r$).

The error amount may be a difference value between the actual yaw rate and the target yaw rate.

The gain used to correct the error amount may be pre-arranged in the form of a look-up table.

In an embodiment, a method of controlling an apparatus for four-wheel independent steering may include: computing, by a control unit through a rear wheel angle computation unit, an error amount of a yaw rate in a manner that compares an actual yaw rate ($\dot{\omega}^2$) feedback with a predetermined target yaw rate; computing, by the control unit, a corrected rear wheel angle ($Y_r$) in a manner that multiplies a predetermined front/rear wheel angle ratio (Kss) by a gain being used to correct the error amount; and performing, by the control unit, rear wheel steering control based on the front wheel angle ($\delta_f$) and the corrected rear wheel angle ($\delta_r$).

In the computing of the error amount of the yaw rate, the error amount may be a difference value between the actual yaw rate and the target yaw rate.

The gain used to correct the error amount may be pre-arranged in the form of a look-up table.

In one aspect of the present disclosure, an apparatus according to the present disclosure can provide a dynamic steering feel by adjusting a turning radius momentarily while following a target yaw rate when four-wheel independent steering that controls a rear wheel steering angle according to a front wheel steering angle is controlled.

DETAILED DESCRIPTION OF THE ILLUSTRATED EMBODIMENTS

Figure 1:
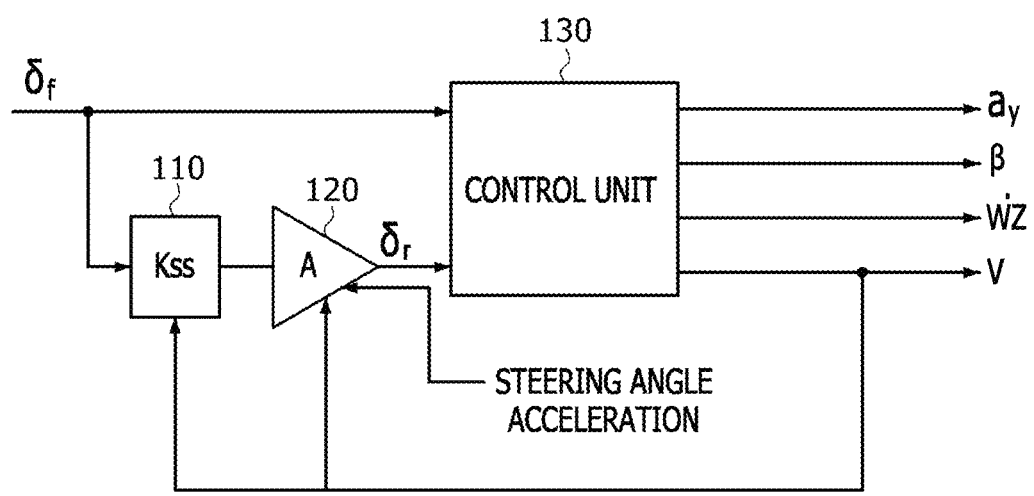
FIG. 1 is an exemplary diagram illustrating a schematic configuration of an apparatus for four-wheel independent steering according to a first embodiment of the present disclosure.

As is traditional in the corresponding field, some exemplary embodiments may be illustrated in the drawings in terms of functional blocks, units, and/or modules. Those of ordinary skill in the art will appreciate that these block, units, and/or modules are physically implemented by electronic (or optical) circuits such as logic circuits, discrete components, processors, hard-wired circuits, memory elements, wiring connections, and the like. When the blocks, units, and/or modules are implemented by processors or similar hardware, they may be programmed and controlled using software (e.g., code) to perform various functions discussed herein. Alternatively, each block, unit, and/or module may be implemented by dedicated hardware or as a combination of dedicated hardware to perform some functions and a processor (e.g., one or more programmed processors and associated circuitry) to perform other functions. Each block, unit, and/or module of some exemplary embodiments may be physically separated into two or more interacting and discrete blocks, units, and/or modules without departing from the scope of the inventive concept. Further, blocks, units, and/or module of some exemplary embodiments may be physically combined into more complex blocks, units, and/or modules without departing from the scope of the inventive concept.

Hereafter, an apparatus for four-wheel independent steering and a method of controlling the same will be described below with reference to the accompanying drawings through various exemplary embodiments.

In such a process, the thicknesses of lines or the sizes of components illustrated in the drawings may be exaggerated for the clarity and convenience in description. Further, terms to be described hereinafter have been defined in consideration of functions in the disclosure, and may differ depending on a user or an operator's intention, or practice. Accordingly, each term should be defined based on the contents over the entire specification.

FIG. 1 is an exemplary diagram illustrating a schematic configuration of an apparatus for four-wheel independent steering according to a first embodiment of the present disclosure.

As illustrated in FIG. 1, the apparatus for four-wheel independent steering according to the first embodiment of the present disclosure includes a rear wheel angle computation unit 110, a gain computation unit 120, and a control unit 130.

The control unit 130 receives information on a front wheel angle ($\delta_f$).

Here, the control unit 130 may receive the information on the front wheel angle ($\delta_f$) detected by an electronic control unit (ECU) (not illustrated).

The rear wheel angle computation unit 110 receives the information on the front wheel angle ($\delta_f$) and information on a vehicle speed (V), and computes a rear wheel angle ($\delta_r$) by multiplying the front wheel angle ($\delta_f$) by a front/rear wheel angle ratio (Kss). The front/rear wheel angle ratio (Kss) is predetermined to correspond to the vehicle speed (V).

Here, the information on the vehicle speed (V) may be input by being detected by the ECU (not illustrated).

For reference, the front/rear wheel angle ratio (Kss) is a ratio between the front wheel angle ($\delta_f$) and the rear wheel angle ($\delta_r$). For example, when the front/rear wheel angle ratio (Kss) is 1, it means that the rear wheel angle is 30 degrees when the front wheel angle is 30 degrees. Accordingly, a target rear wheel angle ($\delta_r$) is computed by multiplying the front wheel angle ($\delta_f$) by the front/rear wheel angle ratio (Kss) (i.e., $\delta_r = K_{ss} * \delta_f$).

For reference, the front/rear wheel angle ratio (Kss) is calculated by Equation 1 below.

$$K_{ss} = \left( \left( \left(1 - \left(\frac{b}{bg-fc}\right)\right) * \left(\frac{V}{L+(kus*V^2)}\right)\right) * \frac{bg-fc}{fd-bh} \right) \quad \text{[Equation 1]}$$

Here, kus denotes an understeer gradient, L denotes an overall distance between a front wheel and a rear wheel. V denotes a vehicle speed.

$$a = -\left(\frac{C_f + C_r}{mV}\right), b = \left(\frac{C_r l_r - C_f l_f}{mV^2} - 1\right), c = \frac{C_f}{mV}, d = \frac{C_r}{mV},$$

$$e = \frac{C_r l_r - C_f l_f}{IV}, f = -\left(\frac{C_f l_f^2 + C_r l_r^2}{IV}\right), g = \frac{C_f l_f}{I}, \text{ and } h = -\frac{C_r l_r}{I},$$

wherein the meaning of these variables is defined according to vehicle dynamics.

The gain computation unit 120 computes a gain (A) that is predetermined to correspond to a steering angle acceleration and the vehicle speed (V).

For example, the gain (A) may be predetermined in the form of a look-up table (LUT) corresponding to the steering angle acceleration and the vehicle speed (V), and the corresponding gain (A) increases as the steering angle acceleration increases, for instance.

Accordingly, the gain computation unit 120 outputs a final rear wheel angle ($\delta_r$) computed by multiplying the rear wheel angle ($\delta_r$) by the gain (A). The rear wheel angle ($\delta_r$) is computed by the rear wheel angle computation unit 110, and the gain (A) is computed to correspond to the steering angle acceleration and the vehicle speed (V).

The control unit 130 outputs a lateral acceleration ($\alpha_L$) a body slip angle ($\beta$), a yaw rate ($\dot{\omega}^2$), the vehicle speed (V), and the like to a rear wheel steering actuator (not illustrated) based on the front wheel angle ($\delta_f$) and the final rear wheel angle ($\delta_r$) to perform rear wheel steering control.

For example, assuming that the vehicle speed (V) is constant, as the steering angle acceleration increases, the corresponding gain (A) increases and, consequently, the final rear wheel angle ($\delta_r$) increases as well. That is, as the steering angle acceleration increases, the final rear wheel angle ($\delta_r$) increases, and the control unit 130 controls a rear wheel based on the increased final rear wheel angle ($\delta_r$), resulting in a decrease in turning radius momentarily, and thus a user can get a dynamic steering feel.

Figure 2:
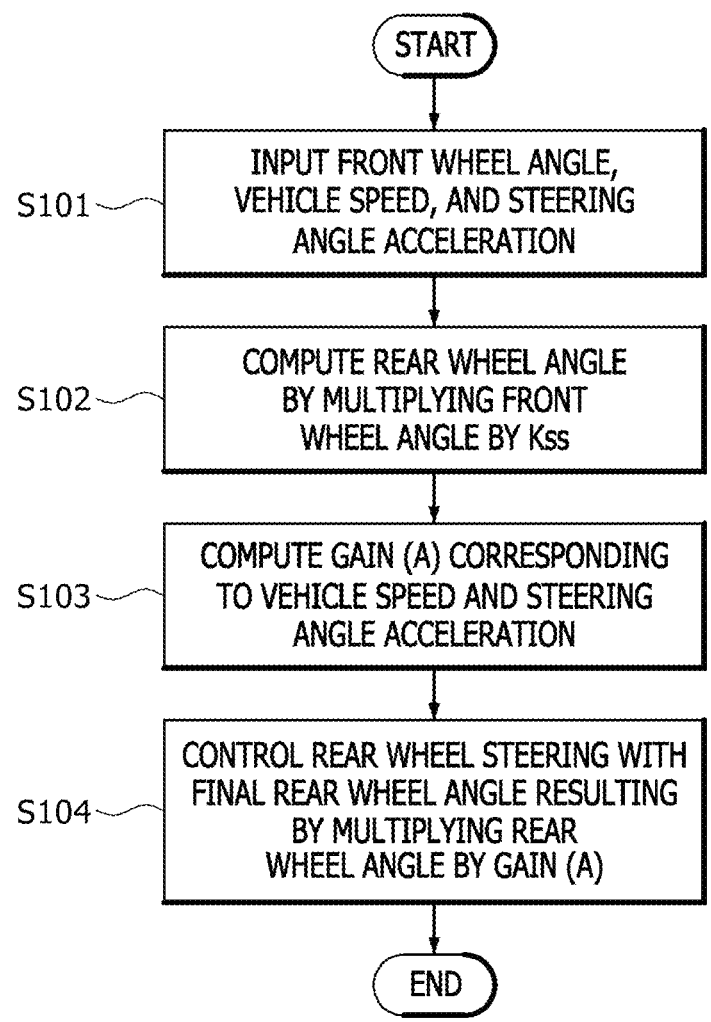
FIG. 2 is a flowchart for describing a method of controlling the apparatus for four-wheel independent steering in FIG. 1.

FIG. 2 is a flowchart for describing a method of controlling the apparatus for four-wheel independent steering in FIG. 1.

Referring to FIG. 2, the control unit 130 receives the information on a front wheel angle ($\delta_f$), vehicle speed (V), and steering angle acceleration (S101).

In addition, the control unit 130 computes a rear wheel angle ($\delta_r$) through the rear wheel angle computation unit 110 by multiplying the front wheel angle ($\delta_f$) by a front/rear wheel angle ratio (Kss) that is predetermined to correspond to the vehicle speed (V) (S102). Through the gain computation unit 120, the control unit 130 computes a gain (A) that is predetermined to correspond to the steering angle acceleration and the vehicle speed (V) (S103).

In addition, the control unit 130 controls the rear wheel steering with the final rear wheel angle ($\delta_r$) that results from multiplying the rear wheel angle ($\delta_r$) by the gain (A), wherein the rear wheel angle ($\delta_r$) is computed by the rear wheel angle computation unit 110, and the gain (A) is computed to correspond to the steering angle acceleration and the vehicle speed (V) (S104).

As described above, according to the present embodiment, since the rear wheel steering is controlled after the final rear wheel angle ($\delta_r$) is computed using the gain (A) corresponding to the steering angle acceleration, the turning radius can decrease momentarily according to the steering angle acceleration when the steering angle acceleration increases, thereby providing the advantageous effect of giving a dynamic steering feel to a user.

Hereinafter, a method of performing four-wheel steering control (i.e., rear wheel steering control) according to another embodiment of the present disclosure will be described. According to the method, the four-wheel steering control follows a target yaw rate under any circumstances, wherein an actual yaw rate may follow the target yaw rate in such a manner that an error amount (i.e., a difference between the actual yaw rate and the target yaw rate) of the actual yaw rate and the target yaw rate are obtained from feedback of the actual yaw rate, and then the Kss gain is multiplied by a Kp gain (i.e., P gain in PID control) which is used to correct the error amount (i.e., the difference between the actual yaw rate and the target yaw rate).

Figure 3:
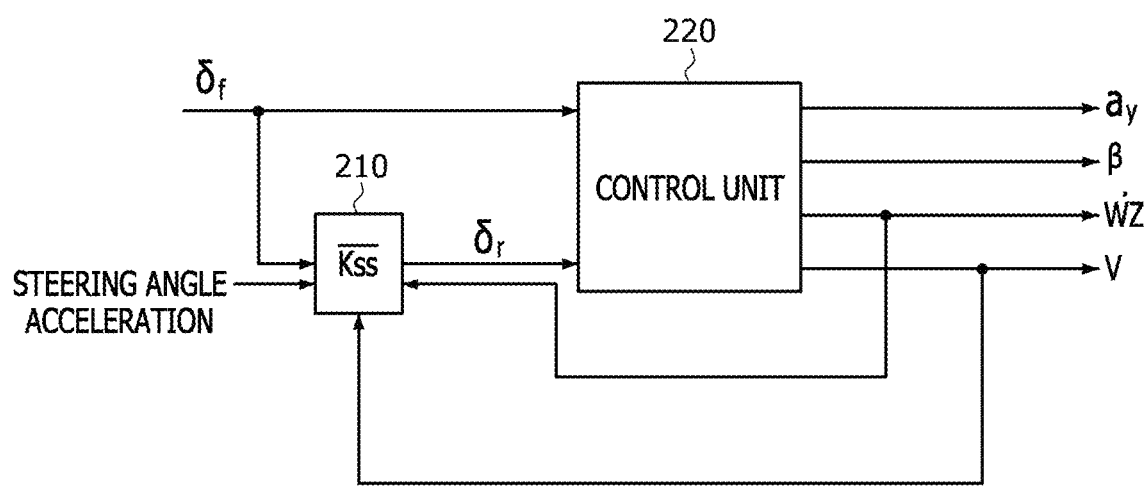
FIG. 3 is an exemplary diagram illustrating a schematic configuration of an apparatus for four-wheel independent steering according to a second embodiment of the present disclosure.

FIG. 3 is an exemplary diagram illustrating a schematic configuration of an apparatus for four-wheel independent steering according to the second embodiment of the present disclosure.

As illustrated in FIG. 3, the apparatus for four-wheel independent steering according to the second embodiment of the present disclosure includes a rear wheel angle computation unit 210 and a control unit 220.

The control unit 220 receives information on a front wheel angle ($\delta_f$).

Here, the control unit 220 may receive the information on the front wheel angle ($\delta_f$) detected by an ECU (not illustrated).

The rear wheel angle computation unit 210 receives a steering angle acceleration, a vehicle speed (V), and an actual yaw rate ($\dot{\omega}^2$).

The rear wheel angle computation unit 210 computes an error amount of the yaw rate (i.e., the difference value between the actual yaw rate and the target yaw rate) by comparing the actual yaw rate ($\dot{\omega}^2$) feedback with the predetermined target yaw rate and computes a corrected rear wheel angle ($\delta_r$) by multiplying a predetermined front/rear wheel angle ratio (Kss) by a gain (Kp gain, i.e., P gain in PID control). The Kp gain is used to correct the error amount (i.e., the difference value between the actual yaw rate and the target yaw rate).

For reference, the front/rear wheel angle ratio ($\overline{K_{ss}}$) to compute the corrected rear wheel angle ($\delta_r$) is calculated by Equation 2 below. The corrected rear wheel angle ($\delta_r$) is used for the actual yaw rate to follow the target yaw rate.

$$\overline{K_{ss}} = \left(1 - \left(\frac{b}{bg - fc}\right) * K_p * \left(\left(\frac{V}{L + (kus * G * V^2)}\right) - \dot{w}z\right) * \frac{bg - fc}{fd - bh}\right)$$ [Equation 2]

Here, kus denotes an understeer gradient, L denotes an overall distance between a front wheel and a rear wheel, V denotes a vehicle speed, $$a = -\left(\frac{C_f + C_r}{mV}\right), b = \left(\frac{C_r l_r - C_f l_f}{mV^2} - 1\right), c = \frac{C_f}{mV}, d = \frac{C_r}{mV},$$

$$e = \frac{C_r l_r - C_f l_f}{IV}, f = -\left(\frac{C_f l_f^2 + C_r l_r^2}{IV}\right), g = \frac{C_f l_f}{I}, \text{ and } h = -\frac{C_r l_r}{I},$$

wherein the meaning of these variables is defined according to vehicle dynamics.

When compared to Equation 1, an additional G gain (variable according to the vehicle speed and the steering angle acceleration) is applied to Equation 2 to have advantages of the four-wheel control because the gain (Kp gain) and the target yaw rate are set to maintain a normal understeer gradient of an existing two-front-wheel drive vehicle. The Kp gain is used to correct the error amount (i.e., the difference value between the actual yaw rate and the target yaw rate).

In this case, Equations 1 and 2 are described to show that the embodiments of the present disclosure can be implemented and are not intended to limit the embodiments.

The control unit 220 outputs a lateral acceleration ($\alpha_L$) a body slip angle ($\beta$), a yaw rate ($\dot{\omega}^2$), the vehicle speed (V), and the like to a rear wheel steering actuator (not illustrated) based on the front wheel angle ($\delta_f$) and the corrected rear wheel angle ($\delta_r$) and performs rear wheel steering control. Thus, the control unit 220 may allow the actual yaw rate ($\dot{\omega}^2$) to follow the target yaw rate desired by a user.

For example, when the four-wheel independent steering control is performed, the control unit 220 may allow the actual yaw rate to follow the target yaw rate under any circumstances by performing the rear wheel steering control with the corrected rear wheel angle ($\delta_r$) that is computed by comparing actual yaw rate feedback with the target yaw rate desired by the user and then multiplying the front/rear wheel angle ratio (Kss) by the Kp gain. The Kp gain may be used to correct a difference between the actual yaw rate and the target yaw rate.

Figure 4:
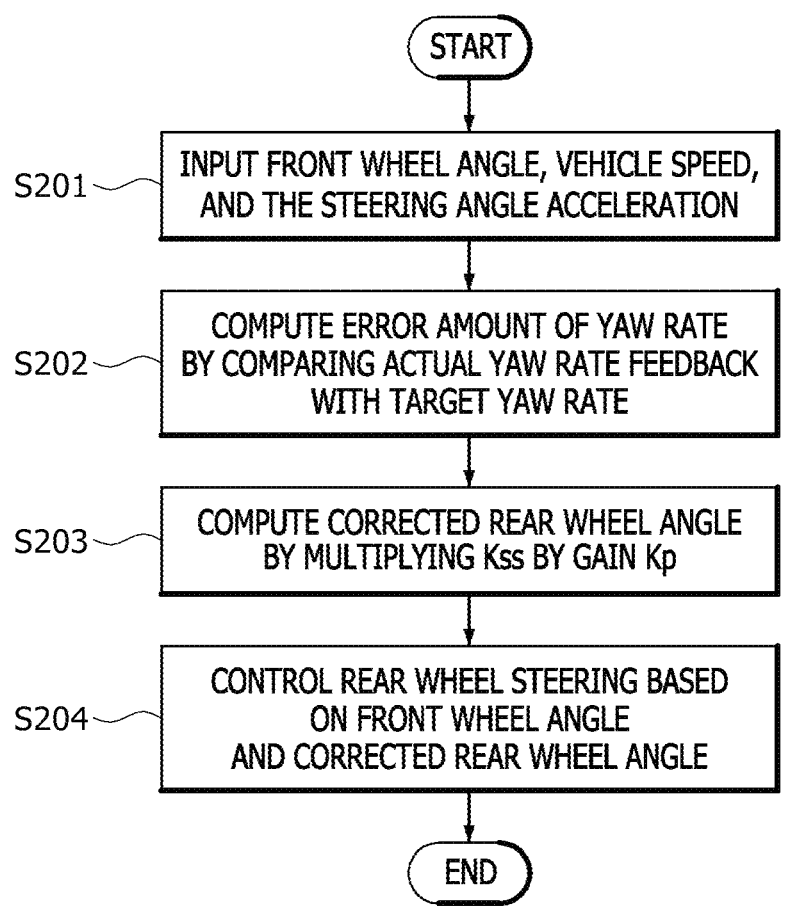
FIG. 4 is a flowchart for describing a method of controlling the apparatus for four-wheel independent steering in FIG. 3.

FIG. 4 is a flowchart for describing a method of controlling the apparatus for four-wheel independent steering in FIG. 3.

Referring to FIG. 4, the control unit 220 receives information on a front wheel angle ($\delta_f$) vehicle speed (V), and steering angle acceleration (S201).

The control unit 220 computes an error amount of the yaw rate (i.e., a difference value between the actual yaw rate and the target yaw rate) through the rear wheel angle computation unit 210 by comparing the actual yaw rate ($\dot{\omega}^2$) feedback with the predetermined target yaw rate (S202).

In addition, the control unit 220 computes the corrected rear wheel angle ($\delta_r$) by multiplying a predetermined front/rear wheel angle ratio (Kss) by the gain (Kp gain, i.e., P gain in PID control), wherein the Kp gain is used to correct the error amount (i.e., the difference value between the actual yaw rate and the target yaw rate) (S203).

In this case, the gain (Kp gain) used to correct the error amount may be provided in the form of a look-up table in advance.

In addition, the control unit 220 may perform the rear wheel steering control based on the front wheel angle $\delta_f$ and the corrected rear wheel angle ($\delta_r$), and thus allow the actual yaw rate ($\dot{\omega}^2$) to follow the target yaw rate desired by the user (S204).

Meanwhile, for the convenience in description, the present embodiments are classified into the first embodiment and the second embodiment. However, depending on mode setting, option setting, or driving conditions (ambient conditions), the first embodiment and second embodiment may be combined or selectable, which makes it possible to allow the turning radius to be adjusted momentarily according to the conditions while following the target yaw rate and thus to allow a user to feel the steering stability and the dynamic steering feel selectively.

As described above, in a case where the four-wheel independent steering control is performed, the present embodiments provide the advantageous effect that the actual yaw rate can follow the target yaw rate under any circumstances by performing the rear wheel steering control with the corrected rear wheel angle ($\delta_r$) that is computed by comparing the actual yaw rate feedback with the target yaw rate desired by the user and then multiplying the front/rear wheel angle ratio (Kss) by the Kp gain. The Kp gain can be used correct the difference between the actual yaw rate and the target yaw rate.

Hereinabove, the present disclosure has been described with reference to exemplary embodiments illustrated in the accompanying drawings, but this is only for exemplary purposes, and those skilled in the art will appreciate that various modifications and other equivalent exemplary embodiments are possible therefrom. Thus, the true technical scope of the disclosure should be defined by the following claims. The implementations described in the present specification may be performed by, for example, a method or a process, an apparatus, a software program, a data stream, or a signal. Although discussed only in the context of single-form implementation (e.g., discussed only as a method), the discussed features may also be implemented as another form (e.g., apparatus or program). The apparatus may be implemented using proper hardware, software, and firmware. The method may be implemented as, for example, an apparatus, such as a processor generally referring to a processing device including a computer, a microprocessor, an integrated circuit, or a programmable logic device. The processor also includes a communication device such as a computer, a cellular phone, a personal digital assistant (PDA), or another device that facilitates the communication of information between end users.

What is claimed is:

1. An apparatus for four-wheel independent steering, comprising:
    a rear wheel angle computation unit configured to compute an error amount of a yaw rate by comparing an actual yaw rate feedback with a predetermined target yaw rate and then compute a corrected rear wheel angle by multiplying a predetermined front/rear wheel angle ratio by a gain being used to correct the error amount; and
    a control unit configured to perform rear wheel steering control based on the front wheel angle and the corrected rear wheel angle.

2. The apparatus of claim 1, wherein the error amount is a difference value between the actual yaw rate and the target yaw rate.

3. The apparatus of claim 1, wherein the gain used to correct the error amount is provided in a look-up table.

4. A method of controlling an apparatus for four-wheel independent steering, the method comprising:
    computing, by a control unit, an error amount of a yaw rate by comparing an actual yaw rate feedback with a predetermined target yaw rate using a rear wheel angle computation unit;
    computing, by the control unit, a corrected rear wheel angle by multiplying a predetermined front/rear wheel angle ratio by a gain being used to correct the error amount; and
    performing, by the control unit, rear wheel steering control based on the front wheel angle and the corrected rear wheel angle.

5. The method of claim 4, wherein, in the computing of the error amount of the yaw rate, the error amount is a difference value between the actual yaw rate and the target yaw rate.

6. The method of claim 4, wherein the gain used to correct the error amount is provided in a look-up table.

* * * * *